April 19, 1932.  A. C. REID  1,854,808
MAP CONSTRUCTION FOR POWER SYSTEMS
Filed April 10, 1930  3 Sheets-Sheet 1
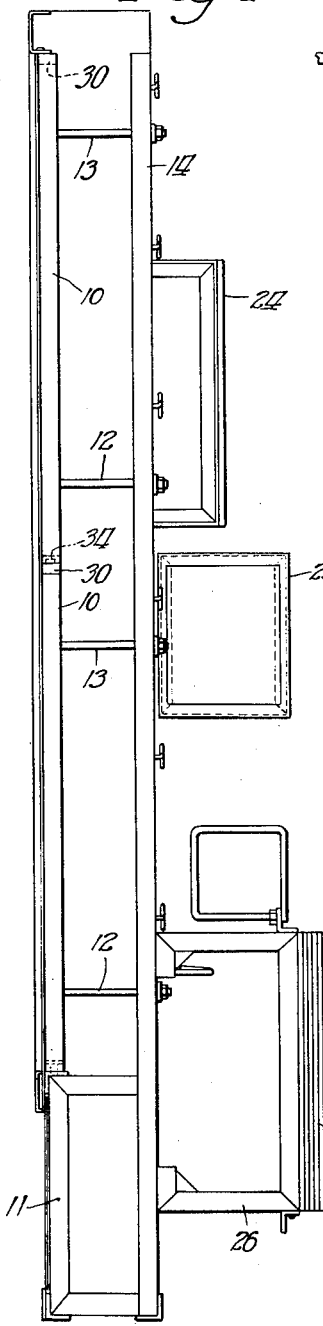
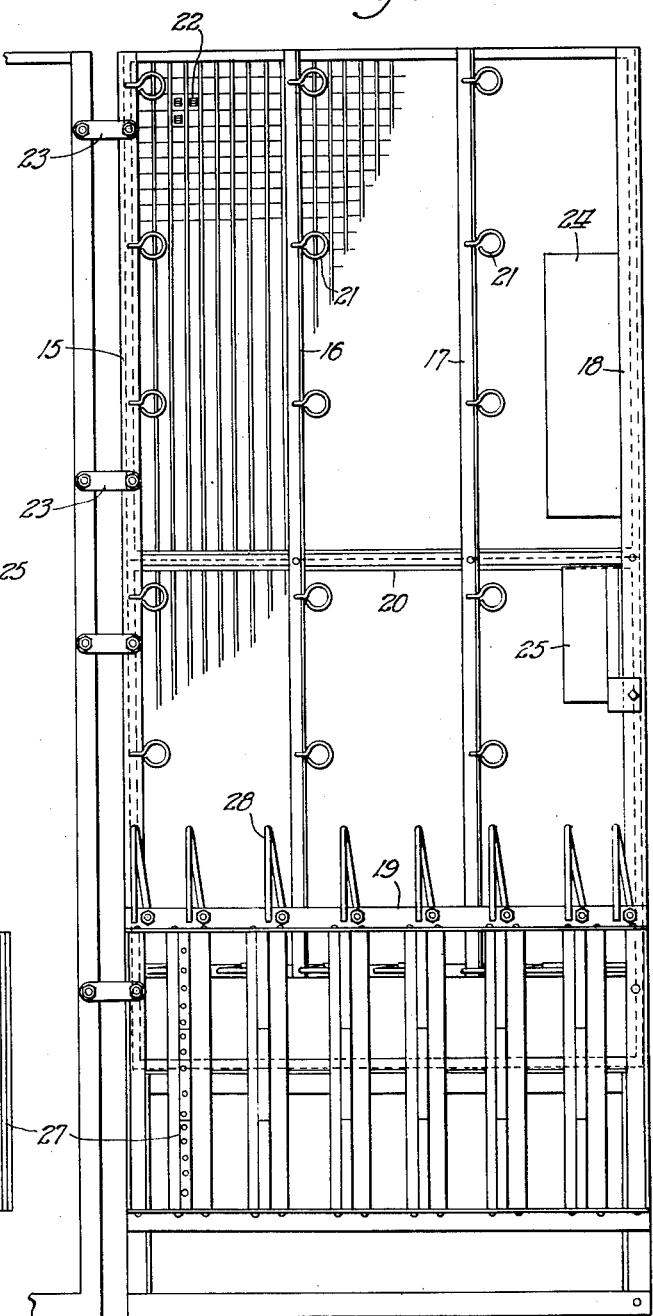
Inventor
Alexander C. Reid
By Paul & Banning Attys.

April 19, 1932.  A. C. REID  1,854,808
MAP CONSTRUCTION FOR POWER SYSTEMS
Filed April 10, 1930    3 Sheets-Sheet 2
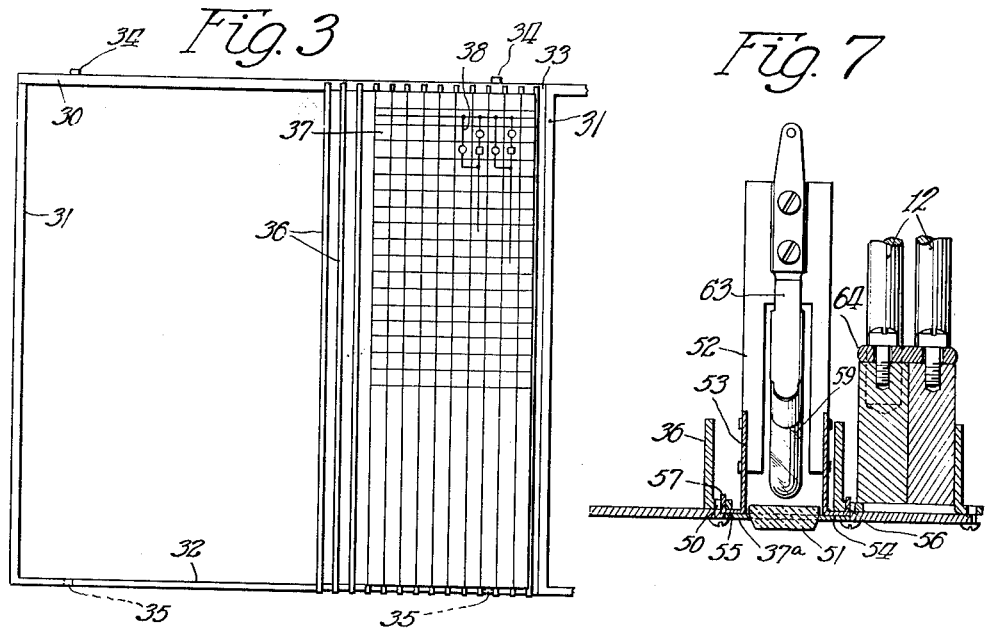
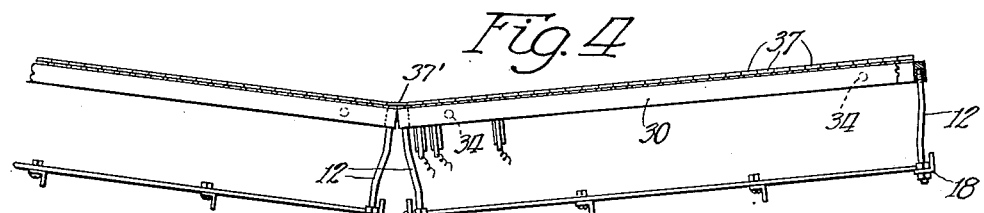
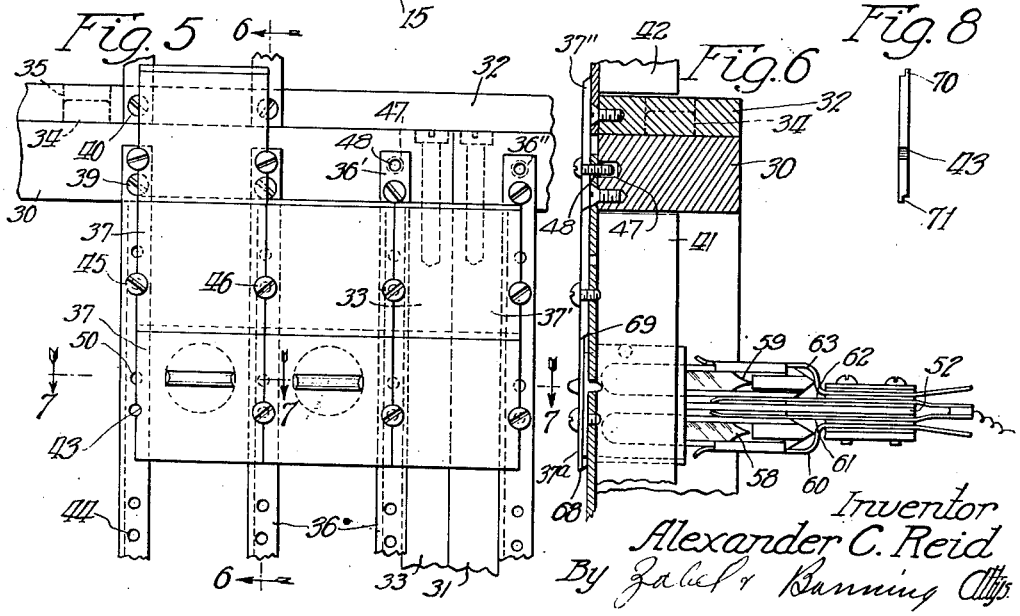
Inventor
Alexander C. Reid
By Zabel & Banning Attys April 19, 1932.   A. C. REID   1,854,808
MAP CONSTRUCTION FOR POWER SYSTEMS
Filed April 10, 1930   3 Sheets-Sheet 3

Inventor
Alexander C. Reid
By: Zabel & Banning Attys.

Patented Apr. 19, 1932

1,854,808

UNITED STATES PATENT OFFICE

ALEXANDER C. REID, OF GENOA, ILLINOIS, ASSIGNOR TO LEICH ELECTRIC COMPANY, OF GENOA, ILLINOIS, A CORPORATION OF ILLINOIS

MAP CONSTRUCTION FOR POWER SYSTEMS

Application filed April 10, 1930. Serial No. 443,102.

My invention relates to a board or map construction for the building up of diagrams representing large distribution or control systems such for instance as electrical power distribution systems.

In systems of this character two features are of prime importance, and the most important of these is complete interchangeability of parts upon the face of the map in order that the diagram may be altered from time to time as desired. The other requirement of great importance is that the surface upon which the map or diagram is laid out must not be broken up by any supporting structure so as to interfere with the continuation of the diagram uninterrupted throughout its greatest extent.

My invention contemplates as the principal purpose thereof certain structural combinations by means of which the two above mentioned requirements are fulfilled.

Another more specific object of the invention consists in providing a map structure of this character for indicating power systems in which the units controlling the signals of the power map such as the relays are mounted on or carried by a map frame.

It is also an object of this invention to provide a map structure of this character consisting of a plurality of frames each one of which is an individual unit capable of interlocking with the other frames to permit building a rigid assembly of any desired size. In this connection, it is also contemplated to construct each individual frame of a plurality of smaller individual units having the surface thereof so built up as to completely cover the frames when they are assembled together without any breaks in the surface.

A further and more specific object of the invention is to provide the individual surface units with cooperating supporting elements and cooperating overlapping portions which effectively prevent transmission of light horizontally from the back of the map to the front.

My invention also contemplates as a means of supporting the units surface rigid spaced elements cooperating with the surface units so as to stiffen the map not only in horizontal direction along the surface of the map but also in a direction at right angles to the map surface to prevent its becoming bent.

I will describe one form which my invention may take by reference to the accompanying drawings wherein—

Fig. 1 is an end view of a map built up of a plurality of sections in accordance with my invention;

Fig. 2 is a back view of the unit shown in Fig. 1;

Fig. 3 is a front view of a map section showing part of the elements removed therefrom;

Fig. 4 is a top plan view showing the manner of joining a pair of adjacent bays together;

Fig. 5 is an enlarged detail view illustrating the construction of the frames by means of the units;

Fig. 6 is a section on the line 6—6 of Fig. 5;

Fig. 7 is a section on the line 7—7 of Fig. 5; and

Fig. 8 is a detailed view of a slightly modified form of unit which may be used in the structure;

Figure 9:
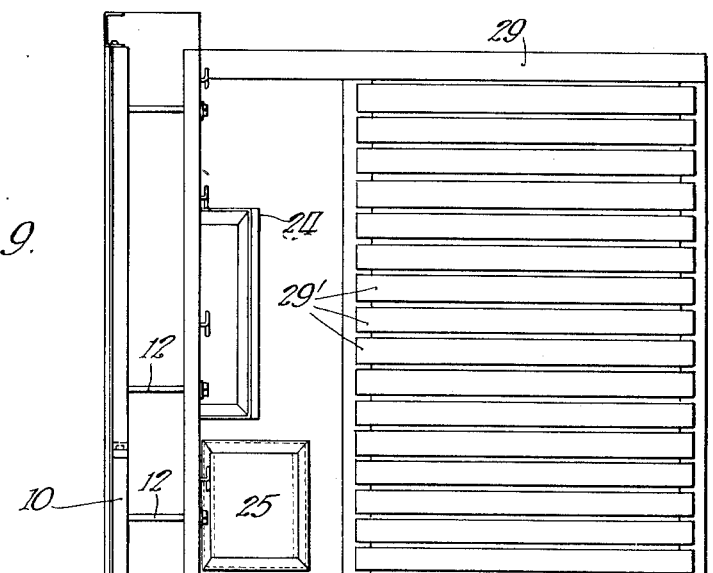
Fig. 9 is an end view of a map frame.

Referring now in detail to the drawings, in Fig. 1 there is shown an end view of a map board which in the present instance consists of a pair of sections as 10—10 which sections are substantially duplicates and rest one upon the other, the lower end being mounted upon a base 11 which may be of any suitable frame structure sufficient to support the frames 10—10. These frames 10—10 while rigid in themselves are linked by suitable bolts such as indicated at 12 and 13 to a reenforcing frame indicated generally by numeral 14. This reenforcing frame consists of upright angle irons such as 15, 16, 17, and 18 joined together by suitable cross bars such as 19 and 20, and they may also be joined to the base 11 in any suitable manner. This back frame 14 has on the uprights 15 to 18 a series of jumper rings such as indicated at 21 to receive the wiring connections for certain units, a group of which are indicated at 22 which units carry indicating signalling devices such as lamps for illuminating the map indicating units.

From Figs. 1, 2, and 4, it will be noted that the frames 10 and 11 with their associated back frame may be connected by suitable straps such as indicated at 23 to a similar bay constructed in the same manner as the one just described, so that any number of these bays may be built up side by side, the showing in Figs. 1, 2, and 4 being of bays set at an angle to each other in order to maintain substantially the same spacing from a central dispatcher's desk in front of which the map stands. Each bay carries suitable frames such as indicated at 24 in which may be mounted any relay or local control equipment necessary for controlling the lamp signal units on the bay. Frame 25 is also used for tell-tale relays for the units upon the bay. The lower frames 26 carry the terminal blocks 27 as well as the large jumper rings 28 which makes it possible to connect the wiring of each individual bay to the units thereon independently of the other bays and independently of any auxiliary or additional relay blocks or the like.

Figure 10:
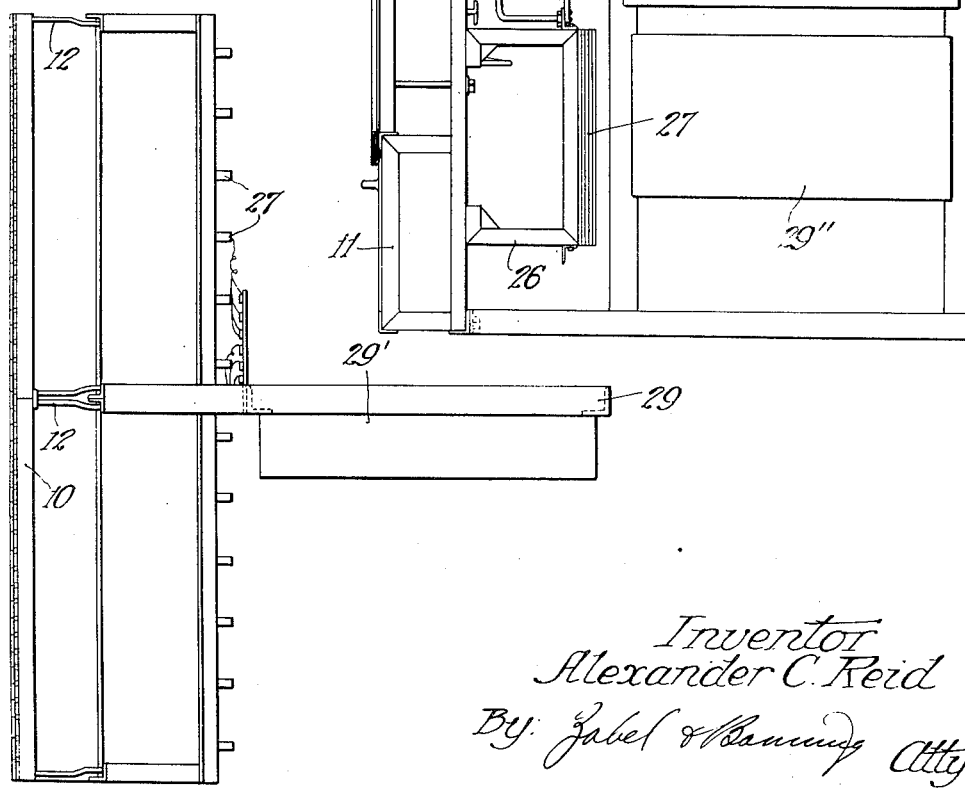
Fig. 10 is a top plan view thereof.

In case the installation is such as to require more relay equipment than can be carried by the local frames 24, such for example as an automatic control, an extra relay frame 29 (see Fig. 9) is used. This frame is preferably mounted at right angles to the map frame and is attached thereto at top and bottom. As shown by Fig. 10, one of these frames 29 may serve two adjacent bays and, owing to its closeness to the map, shorten considerably the length of cable from the relays to the map. As shown, the upper part of frame 29 carries supports 29' for the stepping relays of the automatic control while below at 29'' there is found the support for the selecting relays.

Now the frames 10 are, in the preferred form, all alike and consist of a substantially square frame made up of the metal bars such as 30, 31, 32, and 33. The top bar 30 is provided with a plurality of projections such as indicated at 34, and the lower bar 32 is preferably apertured as indicated at 35 so as to receive the projections of a similar frame member when it is set upon the top thereof thus interlocking the frames vertically while they are interlocked laterally in bays by means of the straps 23 and, as will be pointed out hereinafter, by means of additional units which make the face of the bays adjoining each other complete. In Fig. 3 there has been shown a plurality of upright angle bars 36 which bars are secured to the frame members 30 and 32 to form a support upon which the individual units indicated generally at 37 are mounted, and, upon these units, there is formed, for example by painting, a diagram such as illustrated at 38 of the system which the map is intended to represent, the illustration at 38 being a portion of a map of a power system.

Coming now to the detailed construction of the frames and the small units which go to make the frames complete, the angle bars 36 are secured to the top and bottom members 30 and 32 by means of screws 39 and 40 which extend through the portion of the angle bars that lie parallel to the face of the map, the ends of the web portions 41 and 42 of the angle bars being cut away so that the web portions lie between the frame members 30 and 32 as illustrated in Fig. 6.

The small units 37 which make up the surface of the map are all of the same surface area so that one is interchangeable with the other, and these units are notched out at the sides as indicated in Fig. 5 at 43 over the holes 44 which are screw threaded through the front of the angle bars 36, the width of the units 37 being the distance between centers of adjacent bars 36. Thus, when a unit is placed in position upon its corresponding bar 36, suitable screws 45 and 46 screw-threaded into the openings 44 will clamp the units in position upon the angle bars. This makes it possible to remove the holding screws and take out any individual unit and replace it whenever it is desired.

Now in order to connect across the surface of the frame members such as 30, 31, 32, and 33 so as to provide a smooth surface, the angle bars 36 which lie adjacent to the frame members 31 and 33 are placed as indicated in Fig. 5 so that the distance between the bar 36' on one frame and 36'' on the laterally adjacent frame is equal to the width of one of the units 37 and a suitable unit 37' which is the same size and shape as the other units will bridge across the frame members 32 and 33 and completely hide them from the front of the map making a smooth continuation from one frame to the next lateral frame. In extending vertically from one frame to the next frame, the top frame piece 30 and the lower frame piece 32 also are completely covered by the small units 37. This is accomplished by providing apertures such as indicated at 47 in the top frame member 30 and providing a screw-threaded aperture 48 in the portion of the angle bar which laps over this member 30 to receive the screw such as the screws 46 to clamp a unit 37'' which is as stated before of the same size and shape as the standard units found in the body of the frame.

Thus the map surface is built right across the junction of the frames 10 without any breaks appearing in the surface thereof at all, and, whereas in Fig. 4 laterally adjacent bays are joined at an angle, the little connecting units 37' may be curved slightly so as to make a smooth concave surface adjoining the two straight surfaces of adjacent bays. Frame pieces 31 and 33 of adjacent sections are also tied together by plates 64 as shown.

From the above description, it will be seen that a map surface of any desired number of frames such as the frame 10 may be built up to create a map of any size desired, and, when completed, the outer surfaces of the map will be made up of individual units completely covering the framework and each removable or interchangeable with another so as to permit building the diagram across the map in any direction desired without having breaks due to the crossing of joints between adjacent sections. Thus a line may run uninterrupted throughout the length of the map if desired.

In mounting the indicating units, the apertures 50 in the angle bars 36 are used, and a thinner plate 37a which is also of the same surface area and shape as the units 37 but which carries a suitable light transmitting indicating symbol 51 is used. In conjunction with this, the lamp jack 52 has the mounting frame 53 provided with the outwardly turned flanges such as 54 and 55 which lie between the unit 37a and the flanges on the angle bars 36 so as to be gripped therebetween when the screws secure the unit 37a in position. The frame members 54 and 55 also have the downturned clips 56 and 57 which project through the openings 50 so as to effectively position the lamp jacks and prevent their being twisted out of alignment or shifted in either a lateral or vertical direction.

This makes it possible to change the diagram for instance to show the insertion of a control unit by merely removing the common plate unit 37 showing a line diagram thereon and replacing it with a plate 37a having the proper symbol thereon and a lamp jack 52 to give the indications desired. These lamp jacks 52 preferably carry a pair of lamps such as 58 and 59 and suitable contact elements 60, 61, 62, and 63 for connecting to wiring leads for control to flash either lamp whenever it is desired, the lamps, of course, being made of different colors usually to indicate different conditions of the power units represented by the symbol placed in front of the lamps.

As an example of the system employing lamps of this character and the control thereof to give different indications, attention is directed to the application of Thomas U. White, Serial No. 318,046, filed November 8, 1928, for dispatching system.

The particular signal unit structure is not claimed in this application, but is claimed in my copending application Serial No. 441,692, filed April 4, 1930, on indicating unit for power system maps.

In the use of these lamps difficulty has been encountered due to light passing through the cracks between adjacent units 37. The light is, of course, barred by the flanges of the members 36 along the vertical cracks between units, and, in order to prevent the light shining in the operator's eyes through the horizontal cracks, the units 37 have their top and bottom edges so cut as to prevent the light passing horizontally between them. In Figs. 5 and 6 this is illustrated by the bevelled edges at 68 and 69, and in Fig. 8 a similar unit 37 is shown as being provided with the offsets at 70 and 71 so as to overlap similar vertically adjacent units and completely block the passage of light between the units.

While I have described my invention by reference to a specific form illustrated, it is obvious that various modifications may be made from the exact detail shown and described without departing from the scope of the invention as defined by the claims; and, having thus desired my invention, what I claim as new and desire to secure by Letters Patent is:

1. A display may of the character described made up of a plurality of like sections each section comprising a supporting frame carrying a plurality of individual surface units of similar surface area to form the display surface, said units extending over and completely covering the supporting frames where the sections meet whereby to provide a continuous surface throughout the display map, reenforcing frames spaced from the sections on the side opposite the display surface and fixed thereto, said frames having means for holding laterally adjacent sections together.

2. A display map of the character described made up of a plurality of like sections each section comprising a supporting frame carrying a plurality of individual surface units of similar surface area to form the display surface, said units extending over and completely covering the supporting frames where the sections meet whereby to provide a continuous surface throughout the display map, reenforcing frames spaced from the sections on the side opposite the display surface and fixed thereto, said frames having means for holding laterally adjacent sections together, certain of said units having signal means associated therewith and means mounted on said reenforcing framework for mounting control equipment for the signal means of the sections reenforced thereby.

3. A display map of the character described made up of a plurality of like sections each section comprising a supporting frame carrying a plurality of individual surface units of similar surface area to form the display surface, said units extending over and completely covering the supporting frames where the sections meet whereby to provide a continuous surface throughout the display map, said sections each having means at opposite sides thereof for attachment to other sections, reenforcing frames spaced from the sections on the side opposite the display surface and fixed thereto, said frames having means for holding laterally adjacent sections together.

4. A display map of the character described made up of a plurality of like sections each section comprising a supporting frame carrying a plurality of individual surface units of similar surface area to form the display surface, said units extending over and completely covering the supporting frames where the sections meet whereby to provide a continuous surface throughout the display map, reenforcing frames spaced from the sections on the side opposite the display surface and fixed thereto, said frames having means for holding laterally adjacent sections together at an angle to each other, the units connecting the surfaces of laterally adjacent frames being bent to present concave surfaces joining the laterally adjacent surfaces.

5. A display map of the character described made up of a plurality of like sections each section comprising a supporting frame carrying a plurality of individual surface units of similar surface area to form the display surface, said units extending over and completely covering the supporting frames where the sections meet whereby to provide a continuous surface throughout the display map, the top and bottom edges of said units overlapping to prevent light passing therebetween, and means at the side edges of said units blocking the passage of light therebetween, said last named means forming part of the supporting frame, and said units being secured to said last named means.

6. A display map of the character described composed of a plurality of sections each of which comprises a supporting frame carrying a plurality of individually removable surface units to form the display surface, said units extending over and completely covering the supporting frames where the sections meet whereby to provide a continuous replaceable surface throughout the display map, said surface units and frames co-operating to prevent passage of light between adjacent units through the front of the map.

7. In a display map a supporting frame, a plurality of individually removable surface forming units thereon, certain of said units being provided with signal display means, said signal display means having portions cooperating with the corresponding surface forming unit for mounting purposes, the combined thickness of the signal display units and portions being substantially equivalent to that of the non-signal carrying units.

8. In a display map a supporting frame, a plurality of individually removable surface forming units thereon, certain of said units being provided with signal display means, said signal display means having portions co-operating with the corresponding surface forming unit for mounting purposes and common mounting elements for securing adjacent units and their signal display means to the frame.

9. A display device of the character described, adapted by means of a plurality of interchangeable units to form a continuous surface for depicting unlike combinations that may be formed of a basic display scheme, certain of said units representing elemental characters needed to portray said display scheme, and certain of said units representing fillers, said units being mounted in contiguous relationship, said device having a mounting frame provided with means for individually receiving said units.

10. A display map comprising a plurality of supporting frames each having a surface of individual units of similar surface area, said unit extending across junctions between said frames to present a substantially unbroken surface, a supporting framework and supporting and adjusting means securing said frames to the framework and aligning them with each other.

11. A display device of the character described, adapted by means of a plurality of interchangeable units to form a continuous surface for depicting unlike combinations that may be formed of a basic display scheme, certain of said units representing elemental characters needed to portray said display scheme, and certain of said units representing fillers, said units being mounted in contiguous relationship, said device having a mounting frame provided with means for individually receiving said units, certain of said character representing units having signaling devices mounted therewith.

12. A display device of the character described, adapted by means of a plurality of interchangeable units to form a continuous surface for depicting unlike combinations that may be formed of a basic display scheme, certain of said units representing elemental characters needed to portray said display scheme, and certain of said units representing fillers, said units being mounted in contiguous relationship, said device having a mounting frame provided with means for individually receiving said units, certain of said character representing units having signaling devices mounted therewith, and said mounting frame having a common means for mounting said signaling devices and their associated units thereon.

13. A display device of the character described, adapted by means of a plurality of interchangeable units to form a continuous surface for depicting unlike combinations that may be formed of a basic display scheme, certain of said units representing elemental characters needed to portray said display scheme, and certain of said units representing fillers, said units being mounted in contiguous relationship, said device having a mounting frame provided with means for individually receiving said units, certain of said character representing units having signaling devices mounted therewith, and said mounting frame supporting control equipment for said signaling devices.

14. A display device of the character described adapted by means of a plurality of interchangeable units to form a continuous surface for depicting unlike combinations that may be formed of a basic display scheme, certain of said units representing elemental characters needed to portray said display scheme, and certain of said units representing fillers, said units being mounted in contiguous relationship, said device having a mounting frame provided with means for individually receiving said units, certain of said character representing units including signaling means capable of producing two distinct indications from one unit.

15. A display device of the character described, adapted by means of a plurality of interchangeable units to form a continuous surface for depicting unlike combinations that may be formed of a basic display scheme, certain of said units representing elemental characters needed to portray said display scheme, and certain of said units representing fillers, said units being mounted in contiguous relationship, said device having a mounting frame provided with means for individually receiving said units, said means including frame members having aligned rows of apertures therein, certain of which apertures are screw-threaded, and screws engaging said units and clamping them to said members.

16. A display device of the character described, adapted by means of a plurality of interchangeable units to form a continuous surface for depicting unlike combinations that may be formed of a basic display scheme, certain of said units representing elemental characters needed to portray said display scheme, and certain of said units representing fillers, said units being mounted in contiguous relationship, said device having a mounting frame provided with means for individually receiving said units, said units having aligned recesses in opposite side edges thereof and securing means mounted in said frame having shank portions fitting in said recesses and head portions clamping adjacent units against said frame.

17. A display device of the character described, adapted by means of a plurality of interchangeable units to form a continuous surface for depicting unlike combinations that may be formed of a basic display scheme, certain of said units representing elemental characters needed to portray said display scheme, and certain of said units representing fillers, said units being mounted in contiguous relationship, said device having a mounting frame provided with means for individually receiving said units, said means including duplicate series of apertures in said frame, certain of said units having positioning and guiding lugs extending into certain of said apertures, and unit securing means engaging said units and held in other apertures.

18. A display device of the character described, adapted by means of a plurality of interchangeable units to form a continuous surface for depicting unlike combinations that may be formed of a basic display scheme, certain of said units representing elemental characters needed to portray said display scheme, and certain of said units representing fillers, said units being mounted in contiguous relationship, said device having a mounting frame provided with means for individually receiving said units, certain of said character representing units having symbols therein, and signal means in the rear of said surface capable of giving different indications from said symbols.

19. In a display map, a supporting frame, a plurality of individually removable surface forming units thereon, certain of said units being provided with signal display means capable of giving two distinct indications, said signal display means having portions cooperating with the corresponding surface forming unit for mounting purposes and common mounting elements for securing adjacent units and their signal display means to the frame.

In witness whereof, I hereunto subscribe my name this 5th day of March, A. D. 1930.

ALEXANDER C. REID.